United States Patent [19]

Hegg et al.

[11] Patent Number: 5,121,099
[45] Date of Patent: Jun. 9, 1992

[54] TWO-PAGE AUTOMOTIVE VIRTUAL IMAGE DISPLAY

[75] Inventors: Ronald G. Hegg, Los Angeles; Mao-Jin Chern, Rancho Palos Verdes, both of Calif.

[73] Assignee: Hughes Aircraft Company, Los Angeles, Calif.

[21] Appl. No.: 602,018

[22] Filed: Oct. 23, 1990

Related U.S. Application Data

[63] Continuation-in-part of Ser. No. 576,242, Aug. 31, 1990, abandoned.

[51] Int. Cl.$^5$ ............................................. B60Q 1/00
[52] U.S. Cl. .................................. 340/461; 340/705; 340/980; 359/630
[58] Field of Search ............... 340/705, 980, 815.01, 340/461; 350/174; 353/13, 14; 359/630, 631, 633, 13, 14

[56] References Cited

U.S. PATENT DOCUMENTS

| | | | |
|---|---|---|---|
| 4,694,447 | 9/1987 | Cohen et al. | 350/174 |
| 4,697,879 | 10/1987 | Gerbe | 350/174 |
| 4,927,234 | 5/1990 | Banbury et al. | 340/705 |
| 4,973,139 | 11/1990 | Weinhrauch et al. | 340/705 |

*Primary Examiner*—Jin F. Ng
*Assistant Examiner*—Brent A. Swarthout
*Attorney, Agent, or Firm*—Leonard A. Alkov; Wanda K. Denson-Low

[57] ABSTRACT

A virtual image display for vehicles that includes a first image source for providing first imaging illumination, a second image source for providing second imaging illumination, a combiner responsive to the first and second imaging illumination for producing a combiner imaging illumination output, a negative power aspheric off-axis mirror responsive to the combiner imaging illumination output for providing diverging reflected imaging illumination, and a positive power aspheric off-axis mirror responsive to the diverging imaging illumination for providing converging reflected imaging illumination that produces a virtual image of the image source observable by the vehicle operator. By way of illustrative example, the first image source includes electromechanical gauges, and the second image source includes an alphanumeric display such as a liquid crystal display or a vacuum fluorescent display. The image sources can be selectively illuminated so as to display only one image source at a time, or they can be selectively illuminated so that components of the virtual image are produced by both of the image sources.

3 Claims, 5 Drawing Sheets

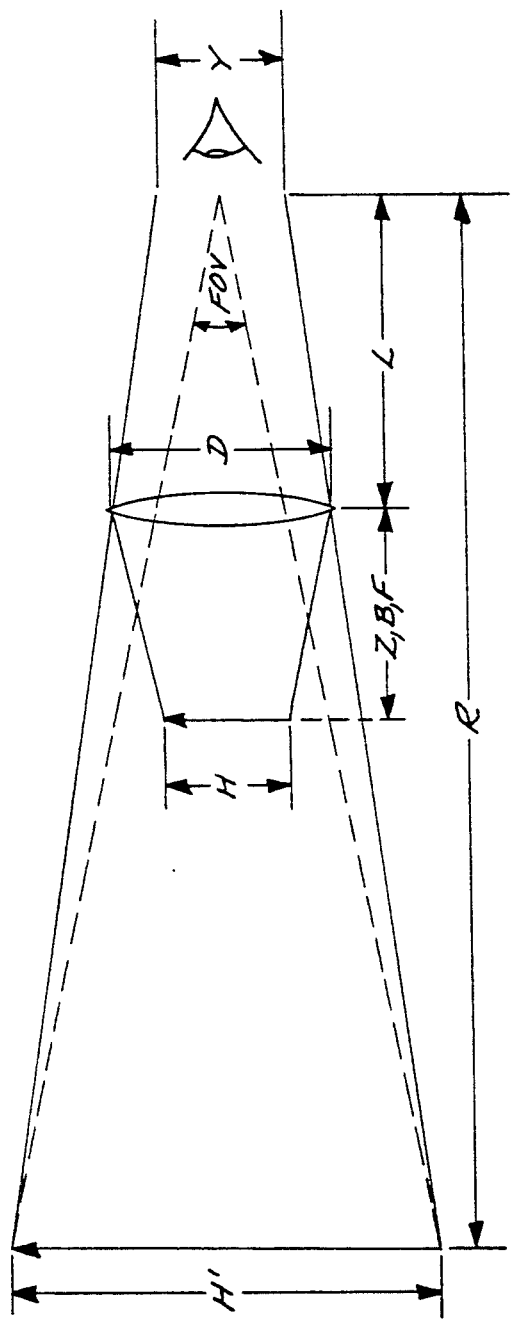
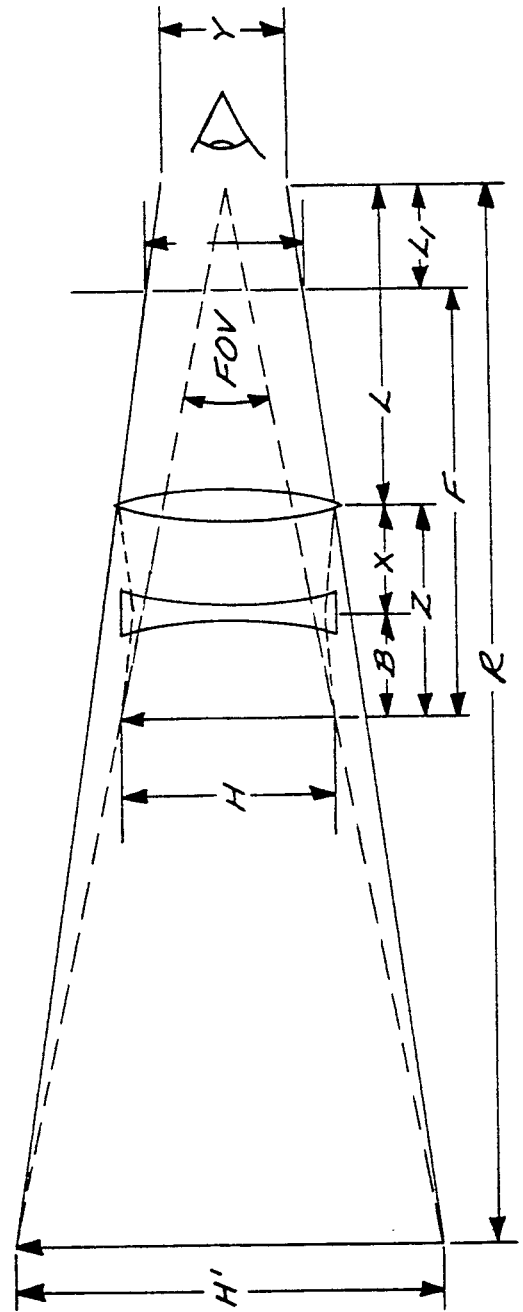
FIG.4
FIG.5

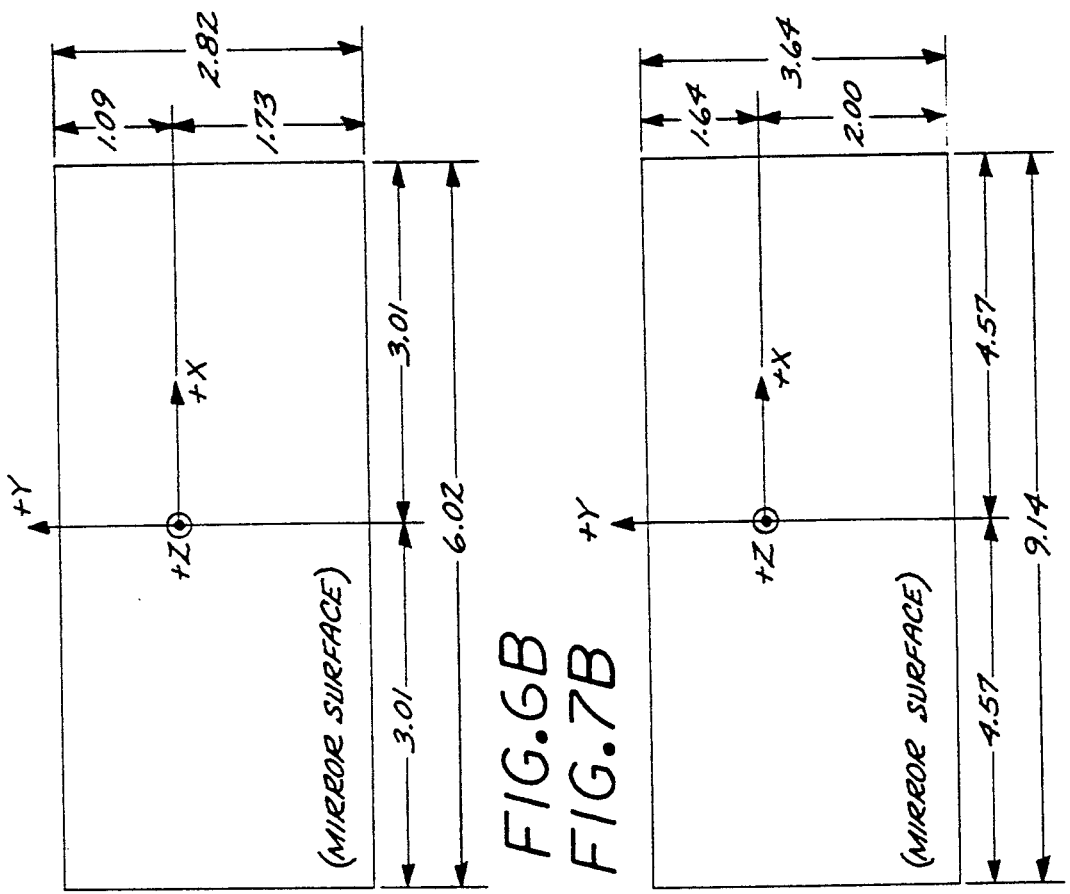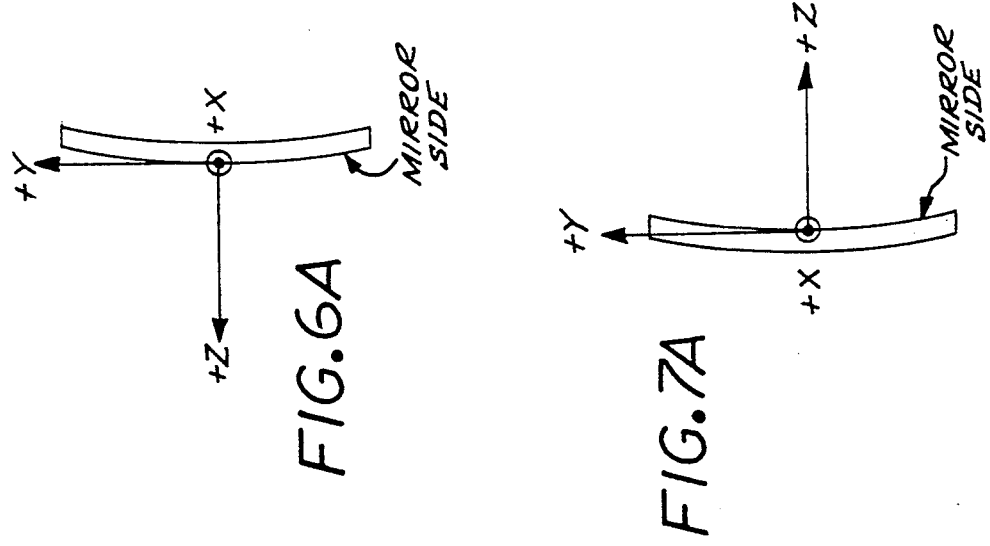

TWO-PAGE AUTOMOTIVE VIRTUAL IMAGE DISPLAY

BACKGROUND OF THE INVENTION

The invention is directed generally to virtual image displays, and is more particularly directed to a virtual image display for vehicle instrumentation which provides a plurality of different displays in the same location.

Vehicle instrumentation commonly includes primary instrumentation which is located in front of the operator, for example, in a traditional instrument cluster positioned in front of the steering wheel. Secondary instruments, including, for example, radio control status indicators, environment control status indicators, trip computer controls and indicators, maintenance annunciators, and message indicators, are commonly located in a center-mounted panel. With advances in display technology, the displays of the secondary instruments are being implemented with vacuum fluorescent displays (VFDs) or cathode ray tubes (CRTs).

A consideration with the separation of primary and secondary instruments, however, includes the required head and eye motion for reading the secondary instruments, producing at least a nuisance if not a potential hazard.

SUMMARY OF THE INVENTION

It would therefore be an advantage to provide a vehicle instrumentation display that provides for display of primary and secondary instrumentation at the same position ahead of the vehicle operator.

Another advantage would be to provide a vehicle instrumentation display that permits the selective display of different types of information at the same position ahead of the driver.

The foregoing and other advantages are provided by the invention in a virtual image display for vehicles that includes a first image source for providing first imaging illumination, second image source for providing second imaging illumination, a combiner responsive to the first and second imaging illumination for providing combiner imaging illumination, a negative power aspheric off-axis mirror responsive to the combiner imaging illumination for providing diverging reflected imaging illumination, and a positive power aspheric off-axis mirror responsive to the diverging imaging illumination for providing converging reflected imaging illumination that produces a virtual image of the image sources observable by the vehicle operator. By way of example, the first and second image sources can be selectively illuminated so as to display only one image source at any given time, or they can be selectively illuminated so that the first image source provides certain components of the virtual image while the second image source provides other components of the virtual image.

BRIEF DESCRIPTION OF THE DRAWING

The advantages and features of the disclosed invention will readily be appreciated by persons skilled in the art from the following detailed description when read in conjunction with the drawing wherein:

FIG. 4 is an elevational view of a single lens display system that is helpful in understanding the virtual image display of FIG. 1.

FIG. 5 is an elevational view of a dual lens display system that is an unfolded version of the virtual image display of FIG. 1 and is helpful in understanding the virtual image display of FIG. 1.

FIGS. 6A and 6B are side and front views of an illustrative example of the negative power mirror of the virtual image display of FIG. 1.

FIGS. 7A and 7B are side and front views of an illustrative example of the positive power mirror of the virtual image display of FIG. 1.

DETAILED DESCRIPTION OF THE DISCLOSURE

Figure 1:
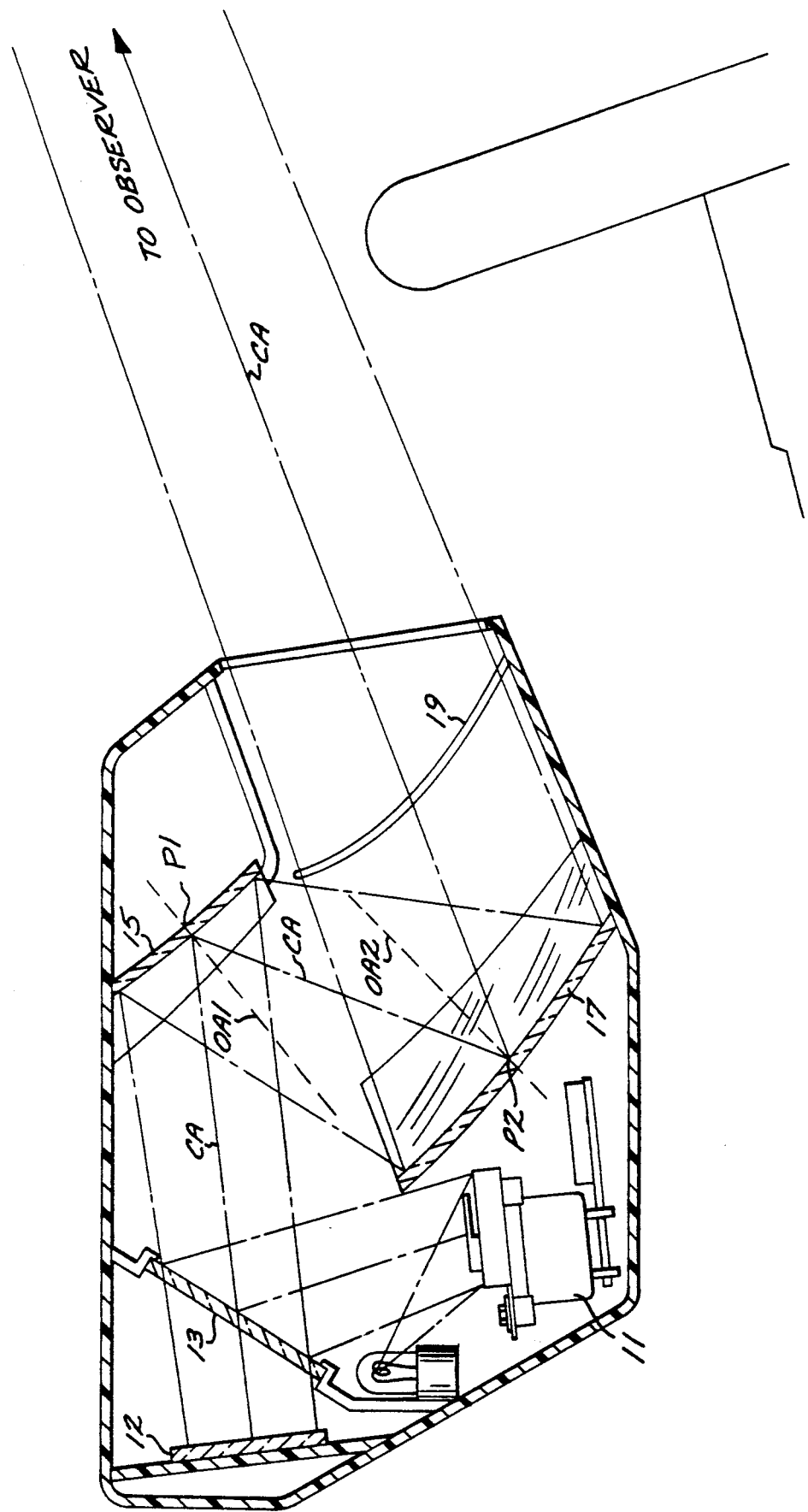
FIG. 1 is an elevational sectional view schematically illustrating the disclosed two-page virtual image display.

In the following detailed description and in the several figures of the drawing, like elements are identified with like reference numerals.

Referring now to FIG. 1, shown therein is a virtual image display system for a vehicle in accordance with the invention. The virtual image display can be located, for example, above the vehicle steering column and ahead of the steering wheel, for example, generally in the region traditionally occupied by an instrument panel.

The display system includes a first image source 11 and a planar combiner 13 for reflecting at least a portion of the imaging illumination from the first image source 11. A second image source 12 provides second imaging illumination to the planar combiner 13 which transmits at least a portion of the second imaging illumination. The reflected first imaging illumination and the transmitted second imaging illumination are directed to an off-axis convex negative power mirror 15 which provides for diverging reflected illumination. The mirror 15 is characterized as having negative power since it would produce image reduction if viewed directly, and is further characterized as providing for diverging reflection since parallel rays incident thereon would diverge upon reflection.

The illumination from the negative power mirror 15 is incident upon an off-axis concave positive power mirror 17 which provides for converging reflected illumination. The mirror 17 is characterized as having positive power since it provides for image magnification, and is further characterized as providing for converging reflection since parallel rays incident thereon would converge upon reflection.

The illumination reflected by the positive power mirror 17 passes through a curved protective window 19 to the observer. The curved protective window 19 is more particularly, as viewed from outside the display system, a concave portion of an elliptically shaped cylinder that is configured so that the reflections therefrom that can be seen by the observer will be limited to reflections of a darkened light trap located above the protective window.

Figures 2, 3:
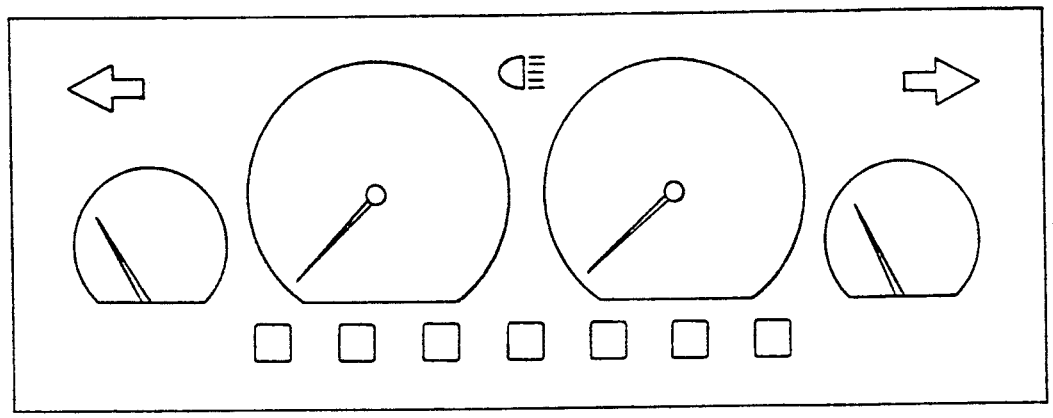
FIG. 2 is a schematic illustration of a display produced by one of the image sources of the display of FIG. 1.
FIG. 3 is a schematic illustration of a display produced by the other image source of the display of FIG. 1.

By way of illustrative example, the first image source 11 comprises (a) a group of electromechanical gauges for indicating speed, engine RPMs, oil temperature, oil pressure, and fuel level, for example; and (b) annunciator lights for turn-signals, high beam, and emergency engine indications, for example. FIG. 2 sets forth a schematic illustration of an example of the display that can be produced by the first image source.

By way of further illustrative example, the second image source comprises a large alpha-numeric display, such as a VFD or a liquid crystal display (LCD), for example, for providing alphanumeric information such as messages, maintenance instructions, and environmental status and settings. FIG. 3 sets forth a schematic illustration of an example of the display that can be produced by the second image source.

The combiner 13 comprises a half-silvered mirror or a dielectric dichroic mirror, for example. By way of particular example, the dichroic mirror is configured to reflect illumination in the yellow/orange/red region of the spectrum and to transmit illumination in the blue/green region. The electromechanical gauges of the first image source would be illuminated with appropriately filtered incandescent bulbs, and the annunciator lights would be configured to produce the appropriate light for reflection by the dichroic mirror. The VFD is self luminous and its output would be in the appropriate spectrum range for transmission by the dichroic mirror.

In operation, the first and second image sources can be displayed independently to provide a two-page display wherein the source to be displayed would be illuminated while the other source would not be illuminated. Also, portions of each display can be selectively illuminated so as to produce a virtual image that comprises the illuminated portions from each image source. For example, the speedometer in the first image source can be the only first image source component illuminated, and selected portions of the second image source are illuminated to produce virtual image components around the speedometer virtual image.

The negative and positive power mirrors 15 and 17 have aspheric, non-rotationally symmetrical reflecting surfaces, and can comprise, for example, injection molded or cast molded plastic substrates having requisite aspheric surfaces which are coated with a metallic reflective coating.

The aspheric elements 15, 17 have respective optical axes OA1, OA2 which are the optical axes defined by the base radii of the respective reflecting surfaces prior to being aspherically deformed. The optical axes pass through the optical axis points P1, P2 which are utilized as the origins of the respective coordinate systems utilized to define the aspheric deformation of the respective surfaces. In other words, the optical axis points P1, P2 and the axes passing therethrough remain fixed while the surrounding areas are aspherically deformed.

For the reflecting surface of the negative mirror 15, the optical axis OA1 bisects the incidence and reflection portions of a central axis CA which is defined by the ray that joins the image source center with the image center and passes through the optical axis points P1, P2. For the reflecting surface of the positive mirror 17, the optical axis OA2 also bisects the incidence and reflection portions of the central axis CA.

Relative to the optical axes OA1, OA2, the aspheric elements are off-axis since the central axis CA is not colinear with the optical axes, and the image source and image do not lie on the optical axes of the aspheric elements including any reflective folds thereof.

The central axis CA further defines an optical path travelled by the imaging illumination from the image source to the eyes of the vehicle operator, and as discussed further herein such optical path has a distance that is greater than the effective viewing distance of the virtual image (i.e., the distance at which the operator's eyes focus in order to view the virtual image).

It is noted that although prior systems have used mirrors comprising off-axis portions of spherical or aspherical sections of a conic (e.g., paraboloid), such systems place the image source on the optical axis of the conic sections used to define the mirrors. This is done to maintain some rotational symmetry for ease of fabrication. However, this limits the performance of such optical systems by constraining the degree of asphericity that one can apply to the mirror surfaces. The optical system described in this invention does away with this restriction by placing the image source off-axis, thereby decoupling the optical axis of the aspheric surface from the image source. The aspheric mirrors of the invention are not rotationally symmetric, taking any shape that improves the overall visual performance. This added degree of design freedom allows this invention to exceed the performance of previous designs.

The negative mirror 15 is the smaller mirror and is positioned relative to the larger positive mirror 17 pursuant to relatively simple optical formulae (e.g., as in a Cassegrain telescope) to achieve a reasonable magnification range for a magnified virtual image without necessitating a change in the sizes of the image source 11, 12 or the virtual image range (i.e., the effective distance at which the viewer's eyes focus to see the virtual image). In accordance with the invention, the virtual image range is in the range of about 4 to 12 feet, which is greater than the typical distance between the driver's eyes and direct view instrumentation in an instrument panel.

The use of a negative mirror and a positive mirror provides for appropriate magnification, virtual image range, field of view, and optical performance (i e., reduction of distortion and disparity), while maintaining an optical system length (i.e., the distance between the image source and the mirror optically closest to the nominal eye position) that is more compact than a single, positive mirror system having comparable parameters. In other words, for a given magnification, virtual image range, field of view, and optical performance, the disclosed dual mirror system would have a shorter system length than a comparable single positive mirror system and therefore a smaller optical package.

The compactness of the dual mirror system results from the reverse telephoto arrangement of the negative and positive mirrors, which provides for an increased working focal length without a significant increase in the system length. The working focal length is the distance from the image source to the "first principle plane" which, as is well known, is located at the position at which a single lens or mirror would be located to produce a single lens or mirror optical system having substantially the same parameters. The first principle plane for the dual mirror system is located between the nominal eye position and the mirror optically closest thereto, while the first principle plane for a single positive mirror system is located at the mirror. In other words, the first principle plane for the dual mirror system is not constrained to be at the physical location of one of the optical elements.

The factors that allow the dual mirror system to achieve a more compact system length can be better understood by a comparison of the single and dual lens systems respectively depicted in FIGS. 4 and 5, which essentially are unfolded versions of a single lens system and a dual mirror system, and are easier to understand. The pertinent optical parameters are as follows:

Range (R): The distance from the nominal eye position to the virtual image.

Eye Relief (L): The distance from the nominal eye position to the first lens surface.

Eye Box (Y): The diameter of the space about the nominal eye position where the virtual image can be viewed without any vignetting.

Field of View (FOV): The angular substance of the virtual image as viewed from the nominal eye position.

System Length (Z): The distance between the lens closest to the eye and the image source.

Back Focus (B): The distance from the image source to the lens nearest the image source.

Working Focal Length (F): The distance from the image source to the first principle plane of the optical system.

Working Diameter (D): The diameter of the first principle plane.

(F-Number (F/#): The ratio of the working focal length and the working diameter (i.e., F/D).

Image Source Size (H): The height (in the vertical plane) of the image source.

Virtual Image Size (H'): The height (in the vertical plane) of the virtual image.

The optical performance of the respective single and dual lens systems (i.e., the reduction of distortion and disparity) is directly related to the working $F/\#$. In particular, performance deteriorates as the working $F/\#$ is decreased. Therefore, for a given performance specification, the working $F/\#$ is generally fixed. Also, it may be desirable to make the system length Z as short as practicable to minimize the optical package.

For a single lens system as shown in FIG. 4, the working focal length F, the back focus B, and the system length Z are equal. The working diameter D is simply the diameter of the lens. For a given range R, eye relief L, eye box size Y, and and field of view FOV, the working diameter D can be expressed as follows:

$$D = 2L \tan(FOV/2) + Y(1 - L/R) \quad \text{(Equation 1)}$$

or $$D = 2L \tan(FOV/2) + Y, \text{ for } R \to \infty \quad \text{(Equation 2)}$$

The required image source size H can be determined by understanding that the ratio of the virtual image size H' and the image source size H is equal to the ratio of the image distance (lens to image) to the image source distance (lens to image source):

$$H = (2R \tan(FOV/2) F)/(R - L) \quad \text{(Equation 3)}$$

or $$H = 2F \tan(FOV/2), \text{ for } R \to \infty \quad \text{(Equation 4)}$$

Thus, for specific FOV, range, eye box, and eye relief requirements, the working diameter is defined by Equation 1. Since the working F/# is minimized and fixed for a specific performance requirement, the working focal length is also fixed (since F=DF/#), and the image source size is then defined by Equation 1.

A single lens system provides adequate performance if the image sources can be arbitrarily sized to match the image source size requirements discussed above. Such sizing can be achieved if the image sources comprise liquid crystal displays (LCDs) or VFDs wherein the size of the graphics can be readily changed to be sufficiently small. However, electromechanical gauges cannot be miniaturized smaller than a certain size, for example, about one inch in diameter. Given the size constraint for an analog image source, the foregoing equations will need to be applied in reverse starting with a given image source size.

If the analog gauge is larger than the proposed image source size dictated by the equations, then both the working focal length and the FOV will have to increase for a constant working F/#. If the FOV must remain constant, then the working diameter will also be constant, and the only way to use a larger image source size will be to increase the F/#. This will also increase the working focal length (even greater than in the case where the FOV can be increased). Given that an analog gauge image source cannot be made as small as an LCD or VFD source, the net result is that the system length must be increased for a single lens system if an analog gauge is used as the image source. A longer system means a longer box and an overall increase in the optical package size.

Consider now the dual lens system of FIG. 5 which is the unfolded version of the disclosed dual mirror system, and functions as a reverse telephoto arrangement that provides for an increased working focal length without an increase in the system length. For simplicity, the range is set to infinity as above relative to the single lens system. The focal length of the two lenses are f1 and f2, with f1 being a positive focal length and f2 a negative focal length. The distance between the two lenses is x. Therefore, the working focal length of this system is:

$$F = (f1)(f2)/(f1 + f2 - x) \quad \text{(Equation 5)}$$

As can be seen in FIG. 5, the focal length actually exceeds the system length. By varying f1 and f2, the focal length is substantially independent of the back focus and the system length. The distance L1 from the nominal eye position to the first principle plane is:

$$L1 = L + x + B - F \quad \text{(Equation 6)}$$

And the working diameter is:

$$D = 2L1 \tan(FOV/2) + Y \quad \text{(Equation 7)}$$

Solving for the image source size H with the range R at infinity, Equation 7 reduces to the following:

$$H = 2F \tan(FOV/2) \quad \text{(Equation 8)}$$

which is the same as Equation 4.

If the image source size is changed while keeping the working F/# and the field of view FOV constant, the working focal length is set by Equation 8; the working diameter D is set by the working F/#; and L1 is set by Equation 7. Equation 6 can then be solved for the quantity (x+B) which is the system length.

As an example of the difference between the single and dual-lens systems, the optical parameters for the single and dual-lens systems will be calculated for the following system specification:

R→∞
L=24"
Y=2.5"
FOV=3°

For reasonable performance, the working F/# should not be less than 2.0.

Using Equation 2 for a single lens system, the working diameter must be 3.757 inches which requires a focal length of 7.514 inches (from F/#=F/D), which is also the system length since for a single lens system the system length is equal to the working focal length. From Equation 4 the image source size must be 0.394 inch.

Consider now the use of an analog gauge package that is one inch in size for the image source From Equation 4 and keeping the FOV at 3°, the focal length must increase to 19.094 inches. This is a 150% increase in the system length. The working diameter will remain at 3.757 inches leaving us with an F/# of 5.082.

If the system length of 19.094 inches cannot tolerated, the FOV can be changed to reduce the focal length. By substituting (D)(F/#) for the focal length F in Equation 2, and by substituting the expression for D from Equation 2, the image source can be related to the working F/# and the FOV:

$$H = (2F/\# \tan(FOV/2))[2L \tan(FOV/2) + Y] \quad \text{(Equation 9)}$$

Solving for the FOV in the above quadratic equation (and keeping the working F/# fixed at 2.0 for our example), provides a value of 5.803. Substituting that value in Equation 4 results in a working focal length of 9.865 inches and a working diameter of 4.933 inches. Though the system length has been reduced to 9.865 inches (still greater than the original 7.514 inches for a smaller image source size of 0.394 inch), the working diameter has increased from 3.757 inches to 4.933 inches (31% larger). Thus, even with the new FOV, the overall size of the system has increased.

The dual lens approach will now be analyzed for an image source size of one inch. From Equation 8, the working focal length is 19.094 inches for a 3° FOV. Setting the distance between the two lenses, x, to be 3 inches and setting the system length to be 7.514 inches (the shortest possible single lens design for the specified eye relief L, eyebox Y, and field of view FOV), the back focus will be 4.514 inches. From Equation 6, L1 is then equal to 12.42 inches. The focal lengths of each lens can vary relative to one another, but one solution from Equation 5 is that f1 is 7.568 inches and f2 is −7.568 inches. Since the size of f1 is the same as the working diameter of the single lens system of 3.757, the F/# of f1 is 2.014.

From the foregoing comparison, it should be appreciated that for a specified image source size along with the optical specification of range, FOV, etc., the dual lens system provided for a system length that is comparable to a single lens system having a smaller image source size. It is also pointed out that since the working F/#'s of the individual lenses in the dual lens system are not too fast, the optical performance will be better than the single lens approach since there are two lenses to optimize.

As to the implementation of the disclosed dual mirror virtual display system, the foregoing analysis of the dual lens system could be utilized to arrive at a first-order design, which would be followed by utilizing an optical design computer program with the spherical mirror versions of the first-order design. With the computer program, the nominal spherical surfaces are deformed to meet the desired criteria of minimizing distortions when viewed in the eyebox. Since the eyebox and virtual image are off-axis with respect to the individual axes of the two mirrors, the equation of the aspheric surfaces can be adjusted independently from the axis joining the eye and the virtual image. This provides for greater latitude in the design process and will better correct the optical aberrations and distortions. Such distortions can cause vertical disparity and magnification variations that are objectionable in the final design.

Referring now to FIGS. 6A, 6B, 7A, 7B, the following sets forth illustrative examples of the aspheric reflecting surfaces of the negative and positive mirrors for a dual mirror virtual image display in accordance as in this invention, wherein the surfaces have aspherically deformed to reduce distortions. The dimensions of the mirrors shown in these figures is in inches.

The aspheric surface of the illustrative example of the negative mirror satisfies the following surface equation relative to the coordinate system shown in FIGS. 4A and 4B:

$$Z(X, Y) = S(X, Y) + \sum_{i=1}^{5} C_i F_i(X, Y)$$

where $C_i$ and $F(X,Y)_i$ are as follows:

| i | $C_i$ | $F(X,Y)_i$ |
|---|---|---|
| 1 | $-0.152819 \times 10^{-1}$ | $X^2 - Y^2$ |
| 2 | $-0.228226 \times 10^{-2}$ | $Y(X^2 + Y^2)$ |
| 3 | $-0.384185 \times 10^{-2}$ | $Y(3X^2 - Y^2)$ |
| 4 | $-0.279668 \times 10^{-3}$ | $X^4 - Y^4$ |
| 5 | $-0.652462 \times 10^{-6}$ | $Y(X^2 + Y^2)^2$ | and $S(X,Y)$ is:

$$S(X,Y) = R + (R^2 - X^2 - Y^2)^{\frac{1}{2}}$$

and $R = -11.8231$.

The following table sets forth data for sample points (in inches) along the aspheric surface of the negative mirror:

| NEGATIVE MIRROR SURFACE SAMPLE POINTS | | |
|---|---|---|
| X | Y | Z |
| +1 | 0 | −0.057928 |
| 0 | +1 | −0.025244 |
| 0 | −1 | −0.028365 |
| +1 | +1 | −0.097131 |
| +1 | −1 | −0.072639 |

The aspheric surface of the positive mirror utilized with the foregoing described negative mirror satisfies the following surface equation relative to the coordinate system shown in FIGS. 5A and 5B:

$$Z(X, Y) = S(X, Y) + \sum_{i=1}^{5} C_i F_i(X, Y)$$

where $C_i$ and $F(X,Y)$ are as follows:

| i | $C_i$ | $F(X,Y)_i$ |
|---|---|---|
| 1 | $-0.617592 \times 10^{-2}$ | $X^2 - Y^2$ |
| 2 | $-0.593066 \times 10^{-3}$ | $Y(X^2 + Y^2)$ |
| 3 | $-0.560451 \times 10^{-3}$ | $Y(3X^2 - Y^2)$ |
| 4 | $-0.206953 \times 10^{-4}$ | $X^4 - Y^4$ |
| 5 | $-0.181196 \times 10^{-4}$ | $Y(X^2 + Y^2)^2$ | and $S(X,Y)$ is:

$$S(X,Y) = R - (R^2 - X^2 - Y^2)^{\frac{1}{2}}$$

and $R = -14.1672$.

The following table sets forth data for sample points (in inches) along the aspheric surface of the positive mirror:

| POSITIVE MIRROR SURFACE SAMPLE POINTS | | |
|---|---|---|
| X | Y | Z |
| +1 | 0 | -0.041533 |
| 0 | +1 | -0.029191 |
| 0 | -1 | -0.029089 |
| +1 | +1 | -0.073142 |
| +1 | -1 | -0.068383 |

The foregoing mirror surfaces can be utilized in a display system having the following parameters:
Range R: 80 inches
Eye Relief L: 24 inches
Back Focus B: 5.7 inches
System Length Z: 9 inches
Image Source Size: 1.25 by 5 inches
Virtual Image Size: 4°×6° at 80 inch range It should be appreciated that the optical axes OA1, OA2 of the aspheric elements described above are along the respective Z axes of the respective coordinate systems utilized to define the aspheric deformation of the respective surfaces, that the central axis CA of the display system that includes the aspheric elements passes through the origins of such coordinate systems, and that such origins correspond to the optical axis points P1, P2.

Figure 8:
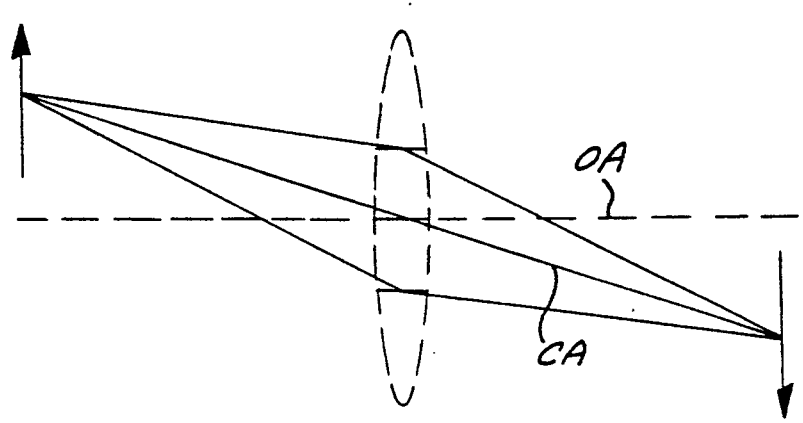
FIG. 8 is a schematic view illustrating an off-axis lens system that is helpful in understanding the off-axis configuration of the virtual image display of the invention.

Referring now to FIG. 8, shown therein is a simple off-axis lens system illustrating the use of "off-axis" in conjunction with the invention. The central axis CA that joins the center of the object and the center of the image is not coincident with the optical axis OA of the lens, and thus the central axis is "off-axis" as are the object and image. In the invention, the off-axis configuration is initially set up relative to the optical axis of a spherical element which is then distorted as described above to achieve the appropriate aspheric surface.

Figure 9:
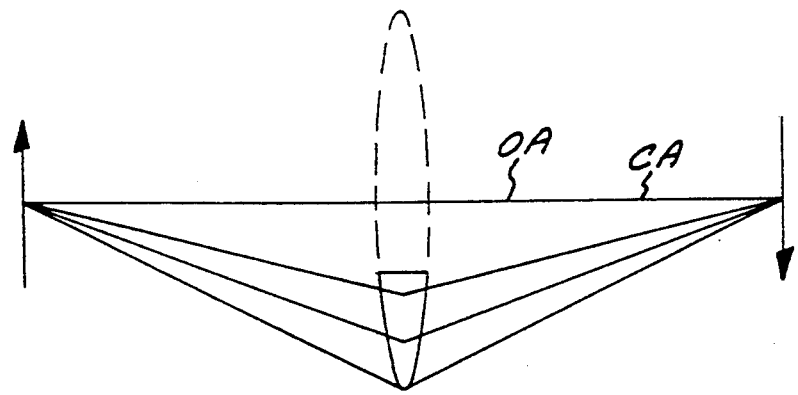
FIG. 9 is a schematic view of an on-axis lens system that utilizes an off-axis portion of a lens that is helpful in understanding known off-axis systems that utilize off-axis portions of optical elements.

Referring now to FIG. 9, shown therein is a simple lens system illustrating known on-axis systems that utilize a portion of an optical element that is positioned off-axis relative to the optical axis of the optical element, where such optical axis is defined by the base radius of the optical element. While an off-axis portion of an optical element is used, the central axis that joins the center of the object and the center of the image is coincident with the optical axis OA and thus "on-axis," as are the object and image (i.e., the object and image lie on the optical axis).

From the foregoing, it should be appreciated that as a result of the configuration of the optical elements for use with electromechanical analog gauges, the second image source comprising an alphanumeric display can be larger than those utilized with a single mirror system, which permits more detail in the graphics. It should also be appreciated that different types of image sources can be utilized, including for example segmented graphical displays, and that both image sources can be of the same type; i.e., both can be electromechanical, alphanumeric, or segmented graphical displays, for example.

The foregoing has been a disclosure of a compact virtual image display system which can advantageously display different vehicle instrumentation information at different times at the same location, which reduces the amount of dashboard space required for instrumentation and further enhances the ease of viewing the instrumentation. Further, the use of magnification permits the use of smaller alphanumeric image sources which are less expensive than the larger direct view versions.

Although the foregoing has been a description and illustration of specific embodiments of the invention, various modifications and changes thereto can be made by persons skilled in the art without departing from the scope and spirit of the invention as defined by the following claims.

What is claimed is:

1. A virtual image display for a vehicle, comprising:
   a first image source including a plurality of electromechanical vehicle instrument gauges for providing electromechanical gauge imaging illumination;
   a second image source including an alphanumeric display for providing alphanumeric imaging illumination;
   a combiner for combining said electromechanical gauge imaging illumination and said alphanumeric imaging illumination to provide combiner imaging illumination;
   a negative power aspheric mirror off-axis with respect to the image sources responsive to said combiner imaging illumination for providing diverging imaging illumination; and
   positive power aspheric mirror responsive to said diverging imaging illumination for providing converging imaging illumination that produces a virtual image of said plurality of electromechanical gauges and said alphanumeric display observable by the operator of the vehicle;
   said aspheric mirrors being off-axis with respect to the image sources whereby the image sources and the virtual image do not lie on the optical axes of the aspheric mirrors and being aspherically deformed to reduce distortions including distortions produced by their off-axis configurations.

2. The virtual image display of claim 1 wherein said combiner comprises a partially reflecting mirror for reflecting said electromechanical gauge imaging illumination and for transmitting said alphanumeric imaging illumination.

3. The virtual image display of claim 1 wherein said combiner comprises a dichroic mirror for reflecting said electromechanical gauge imaging illumination and for transmitting said alphanumeric imaging illumination.

* * * * *